United States Patent [19]

Loos

[11] 4,175,881
[45] Nov. 27, 1979

[54] SELF-ALIGNMENT CLIP FOR ALIGNING HUBS TO FLAT SHAFTS

[75] Inventor: John H. Loos, Dayton, Ohio

[73] Assignee: White Consolidated Industries, Inc., Cleveland, Ohio

[21] Appl. No.: 966,358

[22] Filed: Dec. 4, 1978

[51] Int. Cl.$^2$ .............................................. F16D 1/06
[52] U.S. Cl. ..................................... 403/13; 403/362
[58] Field of Search .................... 403/362, 13, 14, 383

[56] References Cited

U.S. PATENT DOCUMENTS

| | | | |
|---|---|---|---|
| 2,134,655 | 10/1938 | Tornblom | 403/362 X |
| 3,240,517 | 3/1966 | Doyle | 403/362 |
| 3,752,513 | 8/1973 | Sims, Jr. et al. | 403/355 |

Primary Examiner—Andrew V. Kundrat
Attorney, Agent, or Firm—Pearne, Gordon & Sessions

[57] ABSTRACT

A self-alignment clip for use in assembling a shaft switch flat surface into the cylindrical axial bore of a hub. The U-shaped clip is readily fastened on the hub so as to straddle a portion of the hub end such that the clip inner arm is located in the hub axial bore and its outer arm has means for snap-on engagement with a set screw bore. The inner arm permits the flat of the shaft to be readily aligned in telescoping relation with the inner arm such that the shaft set screw or the like is aligned in normal fashion with the flat of the shaft.

1 Claim, 5 Drawing Figures

SELF-ALIGNMENT CLIP FOR ALIGNING HUBS TO FLAT SHAFTS

This invention relates to an improved means for attaching a hub to a shaft and more particularly to a self-alignment clip which is adapted to be used to facilitate the mating of a hub and shaft at assembly.

There are numerous means for attaching hubs to flat shafts having a conventional flat surface engageable with a set screw or the like. One example of such an arrangement is disclosed in U.S. Pat. No. 3,240,517 to Doyle, issued Mar. 15, 1966, wherein shaft alignment means are provided in the form of a projection of the hub material which extends radially inwardly with respect to the bore centerline so as to permit the shaft to enter the bore only when the hub and shaft are in the desired angular relationship.

It is an object of the present invention to provide an improved alignment clip for hub and shaft assemblies to facilitate the assembly of a hub with a shaft having a conventional flat surface engageable with a set screw or the like wherein the clip includes an inner arm permitting the flat of the shaft to be positioned in juxtaposed substantially parallel relation with the plane of the inner arm only when the hub and shaft are in the desired angular relationship with respect to the hub set screw radial bore such that the set screw is aligned with the flat of the shaft at assembly.

Further objects and advantages of the present invention will be apparent from the following description, reference being had to the accompanying drawings wherein a preferred embodiment of the present invention is clearly shown.

Figure 1:
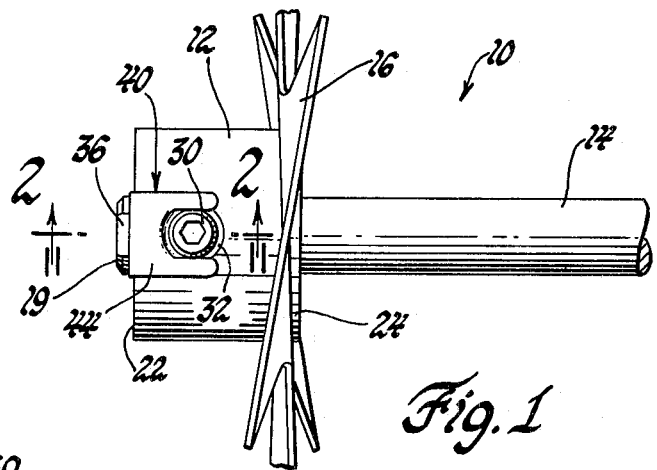
FIG. 1 is an elevational view of one illustrative embodiment of this invention showing a shaft assembled with a fan hub.

A hub and shaft assembly 10 as seen in FIG. 1 shows a metal hub 12 mounted on a rotatable metal shaft 14 which shaft is driven by suitable means such as an electric motor (not shown). In the disclosed form of the invention the hub 12 includes various fan blades 16 suitably supported thereon such as by a spider having a central opening to facilitate installation of the hub.

Figure 2:
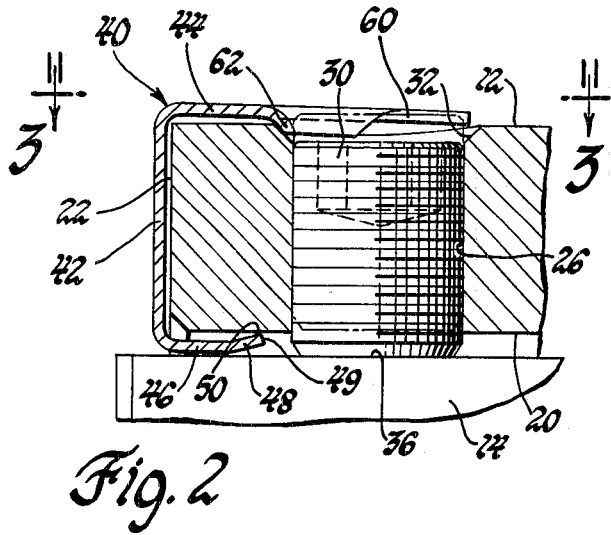
FIG. 2 is a fragmentary vertical sectional view showing a portion of the hub and shaft including the clip of the present invention in association therewith.
Figure 3:
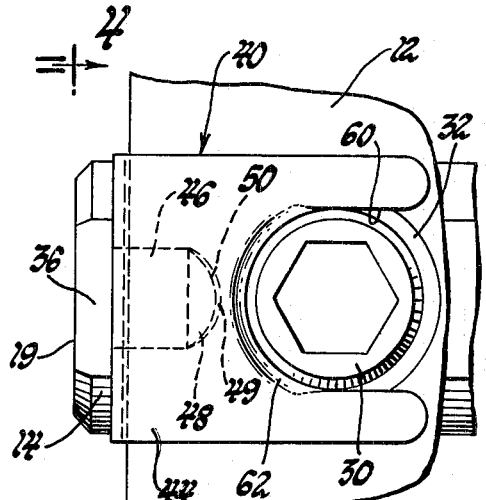
FIG. 3 is a fragmentary elevational view taken on line 3—3 of FIG. 2.
Figure 4:
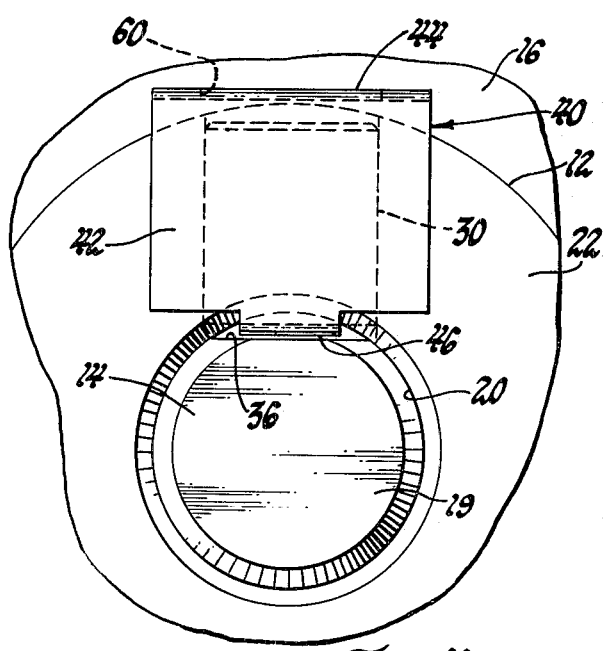
FIG. 4 is an enlarged fragmentary vertical sectional view taken substantially on the line 4—4 of FIG. 3.

As seen in FIGS. 2 and 4, the hub 12 has a cylindrical axial through bore 20 extending longitudinally thereof from an outer end 22 of the hub to its inner end 24. A conventional set screw radial threaded bore 26 is provided in the annular wall of the fan hub 12 with a set screw 30 threadably received in the outer end of the radial bore 26. The radial bore 26 is oriented with its principal axis generally perpendicular with respect to the longitudinal axis of the shaft cylindrical bore 20 so as to intersect the axis of bore 20. It will be noted in FIG. 2 that the radial threaded bore 26 outer end periphery has an edge portion 32 beveled at a defined angle which in the disclosed embodiment is an angle of about 45°.

The conventional set screw 30 is shown threadably received in the radial bore 26 such that when the shaft 14 is inserted in the hub axial bore 20 the set screw 30 is adapted to contact a flat 36 on the shaft before the set screw can be properly tightened. It will be appreciated that if the set screw is slightly angled with respect to the plane of the flat 36, then although the screw is fully tightened with the prescribed torque, the hub will not be properly secured to the shaft and may loosen such as when an air load is subsequently applied by the fan blades 16 to the hub.

In accordance with the present invention prior to the assembly of the hub 12 on the shaft 14, a clip generally indicated at 40, is assembled on one end of the hub 12 to enable proper alignment between the shaft flat portion 36 and the radial set screw bore 26.

Figure 5:
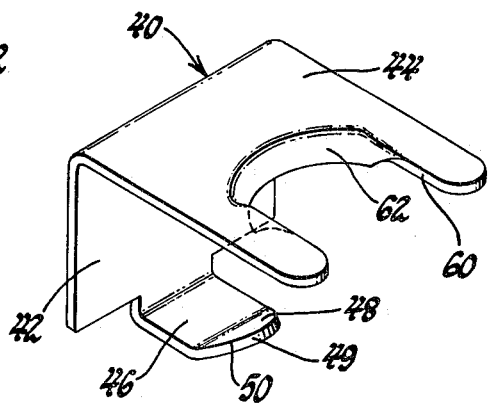
FIG. 5 is a perspective view of the alignment clip of the present invention.

As best seen in the perspective view of FIG. 5, the clip 40 comprises a generally U-shaped resilient member, preferably formed of spring sheet metal, including a planar base portion 42 and two relatively flat outer 44 and inner 46 parallel arms extending normally from the opposite ends of the base portion 42. It will be noted in FIG. 2 that the inner arm 46 free end terminates in a semi-cylindrical tab 48 which is inclined at a predetermined angle of about 15° from the arm 46 toward the outer arm 44 with the tab peripheral portion 49 defining an arcuate shaped edge 50 substantially conforming to the curvature of hub axial bore 20.

As best seen in FIG. 1, the clip 40 is adapted for assembly with the hub inner end 22 with its outer arm 44 extending substantially parallel with the axis of the axial bore 20 on the exterior of the hub. The clip inner arm 46 extends within the cylindrical bore with the clip base portion 42 closely adjacent the hub inner end 22. The distal or free end of the clip outer arm 44 includes an axially extending open-ended slot 60 formed with an inner predetermined radiused lip or closed end 62 for substantially concentric locaton with the radial bore edge portion 26. As best seen in FIG. 2, the slot inner closed end integral lip portion 62 is shown extending toward the inner arm and sized or adapted for snap-on retention engagement with the radial bore beveled edge portion 32. It will be noted that the inclined tab arcuate end 49 is adapted to be in spaced defined axial distance from the inner opening of the radial bore 26. Thus, upon the clip straddling a portion of the hub end 22 the tab edge 50 engages a portion of the axial bore 20 so as to cooperate with the lip portion 62 to securely removably retain the clip to the hub in snap-on fashion.

It will be noted that during assembly the set screw 30 is partially threaded into the bore 26 such that upon the insertion of the inner arm 48 in the hub axial bore 20 the slot 60 is positioned to receive the set screw 30 therein so as to pilot or guide the clip in assembled relationship with the hub.

Upon the telescopic insertion of shaft end 19 into the hub end 24 of the hub, shaft end 19 contacts the inner arm inclined tab 48 permitting the shaft flat 36 to be positioned in juxtaposed substantially parallel relation with the plane of the inner arm 46 only when the hub and shaft are in the desired angular relationship with respect to the radial bore 26. As a result, upon the set screw 30 being threadably advanced in the radial bore it engages the flat of the shaft in a normal manner to hold the hub 12 in fixed assembled relation with the shaft 14.

p While the embodiment of the present invention as herein disclosed constitutes a preferred form, it is to be understood that other forms might be adopted.

The embodiments of the invention in which an exclusive property or privilege is claimed are defined as follows:

1. An alignment clip for aligning a hub for a rotary structure with a shaft which has a flat portion extending from one end thereof and engageable with a set screw or the like, said hub having a generally cylindrical bore therein which extends therethrough from one end to another, said bore being circular in cross section so as to normally receive said shaft in any angular relation, said hub also having a radial bore which is oriented with its principal axis generally perpendicular with respect to the longitudinal axis of said cylindrical bore and intersecting said cylindrical bore, said radial bore outer end periphery having an edge portion beveled at a defined angle, said clip comprising a U-shaped resilient sheet metal member in cross-section including a base portion and two relatively flat outer and inner parallel arms extending normally from the opposite ends of said base portion, said inner arm having a free end terminating in a tab inclined toward said outer arm, said clip being adapted for assembly with the hub one end with its outer arm extending parallel with the axis of said cylindrical bore on the exterior of the hub and its inner arm extending within the cylindrical bore with the clip base portion closely adjacent the hub one end, the distal end of said clip outer arm including an axially extending open-ended slot formed with an inner radiused closed end for substantially concentric location with said radial bore, said slot inner radiused closed end formed with an integral lip portion extending toward said inner arm and adapted for snap-on retention engagement with the radial bore beveled edge portion such that said inclined tab free end is adapted to be spaced a defined axial distance from the inner edge of said radial bore, whereby said clip is positioned with respect to the axes of said cylindrical bore and said radial bore to form a plane with said inner leg as a chord of said hub cylindrical bore substantially normal to the axis of said radial bore to provide shaft alignment means in cooperation with the flat on the shaft, whereby during telescopic insertion of the shaft into the other end of the hub bore the shaft end contacts said inner arm inclined tab permitting the flat of the shaft to be positioned in juxtaposed substantially parallel relation with the plane of said inner arm only when the hub and shaft are in the desired angular relationship with respect to said radial bore, whereby the set screw or the like received in the radial bore must engage the flat of the shaft to hold the hub in fixed assembled relation with the shaft.

* * * * *